(12) United States Patent
Sano (10) Patent No.: US 11,908,097 B2
(45) Date of Patent: Feb. 20, 2024

(54) INFORMATION PROCESSING SYSTEM, PROGRAM, AND INFORMATION PROCESSING METHOD

(71) Applicant: Akatsuki Inc., Tokyo (JP)

(72) Inventor: Fumihiro Sano, Tokyo (JP)

(73) Assignee: AKATSUKI INC., Tokyo (JP)

(*) Notice: Subject to any disclaimer, the term of this patent is extended or adjusted under 35 U.S.C. 154(b) by 0 days.

(21) Appl. No.: 18/252,338

(22) PCT Filed: Jul. 14, 2022

(86) PCT No.: PCT/JP2022/027675
§ 371 (c)(1),
(2) Date: May 9, 2023

(87) PCT Pub. No.: WO2023/002907
PCT Pub. Date: Jan. 26, 2023

(65) Prior Publication Data
US 2023/0306703 A1 Sep. 28, 2023

(30) Foreign Application Priority Data

Jul. 20, 2021 (JP) .................................. 2021-119379

(51) Int. Cl.
*G06T 19/20* (2011.01)
*A63F 13/213* (2014.01)
(Continued)

(52) U.S. Cl.
CPC ............ *G06T 19/20* (2013.01); *A63F 13/213* (2014.09); *A63F 13/55* (2014.09); *G06V 40/28* (2022.01);
(Continued)

(58) Field of Classification Search
CPC ............ G06T 19/20; G06T 2219/2004; A63F 13/213; A63F 13/55; G06V 40/28
See application file for complete search history.

(56) References Cited

U.S. PATENT DOCUMENTS 9,360,944 B2 * 6/2016 Pinault .................. A63F 13/212
9,721,383 B1 * 8/2017 Horowitz ................ G06T 7/194
(Continued)

FOREIGN PATENT DOCUMENTS

JP 2012203737 A 10/2012
JP 5117466 B2 1/2013
(Continued)

OTHER PUBLICATIONS

International Search Report dated Oct. 4, 2022 for International Application No. PCT/JP2022/027675.
(Continued)

*Primary Examiner* — YuJang Tswei (57) ABSTRACT

An information processing system, a program, and an information processing method that can improve convenience when operating a movable object within an application. An information processing system that provides an application that can be executed on an information processing terminal includes a detection unit that detects a three-dimensional motion of a finger of a user, and a motion control unit that controls a three-dimensional motion of a movable object within the application based on the three-dimensional motion of the finger of the user detected by the detection unit.

7 Claims, 10 Drawing Sheets

(51) Int. Cl.
    *A63F 13/55*         (2014.01)
    *G06V 40/20*        (2022.01)
    *G06F 3/04815*     (2022.01)
    *G06F 3/01*          (2006.01)
    *A63F 13/428*      (2014.01)
    *G06F 3/0346*      (2013.01)

(52) U.S. Cl.
    CPC .............. *A63F 13/428* (2014.09); *G06F 3/01*
          (2013.01); *G06F 3/0346* (2013.01); *G06F*
      *3/04815* (2013.01); *G06T 2219/2004* (2013.01)

(56) References Cited

U.S. PATENT DOCUMENTS

| | | | | |
|---|---|---|---|---|
| 2011/0025689 A1* | 2/2011 | Perez | ....................... | A63F 13/69 |
| | | | | 345/420 |
| 2011/0173204 A1* | 7/2011 | Murillo | ................. | A63F 13/213 |
| | | | | 715/863 |
| 2015/0172626 A1* | 6/2015 | Martini | ................... | G06T 7/246 |
| | | | | 348/50 |
| 2017/0256099 A1* | 9/2017 | Li | ....................... | G06F 3/04815 |
| 2018/0260033 A1* | 9/2018 | Norieda | .................. | G06F 3/014 |

FOREIGN PATENT DOCUMENTS

| | | |
|---|---|---|
| JP | 2013218379 A | 10/2013 |
| JP | 2014115876 A | 6/2014 |
| JP | 2017211884 A | 11/2017 |
| JP | 2018055614 A | 4/2018 |
| JP | 2018206080 A | 12/2018 |
| JP | 2020113094 A | 7/2020 |

OTHER PUBLICATIONS

Notification of reasons for refusal dated May 12, 2022 for Japanese Patent Application No. 2022-055932.
Notification of reasons for refusal dated Jan. 12, 2023 for Javanese Patent Application No. 2022-167753.

\* cited by examiner

INFORMATION PROCESSING SYSTEM, PROGRAM, AND INFORMATION PROCESSING METHOD

TECHNICAL FIELD

The present invention relates to an information processing system, a program, and an information processing method.

BACKGROUND ART

Information processing systems that provide applications via an information processing device (user terminal) such as a computer or a smartphone are already known. For example, in recent years, games that can be executed on user terminals such as smartphones or game terminals capable of accessing a server via a network have been provided (for example, see Patent Literature 1).

In a game that can be executed on a user terminal, a virtual operation portion that is also referred to as a "virtual stick" exists that is displayed on a game screen, and by this operation portion being operated by, for example, a swiping motion of a user, a player (movable object) in the game that the user uses is controlled.

CITATION LIST

Patent Literature

Patent Literature 1
Japanese Patent No. 5117466

SUMMARY OF INVENTION

Technical Problem

In a game in which a virtual operation portion is displayed on a game screen as described above, because a player is operated by a swiping motion in which the user touches the game screen, for example, a three-dimensional motion of the player in the depth direction with respect to the game screen cannot be actualized. Therefore, the motion of the player may be limited to two-dimensional motion, and thus there is room for improvement in operability.

The present invention has been made in view of the situation described above, and an object of the present invention is to provide an information processing system, a program, and an information processing method that can improve the convenience when operating a movable object within an application.

Solution to Problem

The information processing system of the present invention for achieving the above object is an information processing system which provides an application that can be executed on an information processing terminal, and includes:

a detection unit that detects a three-dimensional motion of a finger of a user, and a motion control unit that controls a three-dimensional motion of a movable object within the application based on the three-dimensional motion of the finger of the user detected by the detection unit.

According to this, a movable object within an application is three-dimensionally controlled according to the three-dimensional motion of the finger of the user which is detected by the detection unit. Hence, because the user can operate the application intuitively, the convenience of the user when operating an application such as a game is improved.

Advantageous Effect of Invention

According to the present invention, the convenience of a user when operating a movable object within an application is improved.

BRIEF DESCRIPTION OF DRAWINGS

FIG. 2 Similarly.

FIG. 3 Similarly.

FIG. 4 Similarly.

FIG. 5 Similarly.

FIG. 6 Similarly.

FIG. 7 Similarly.

FIG. 8 Similarly.

FIG. 9 Similarly.

FIG. 10 Similarly.

FIG. 11 Similarly.

DESCRIPTION OF EMBODIMENT

Next, an information processing system according to an embodiment of the present invention will be described with reference to FIG. 1 to FIG. 11.

Figure 1:
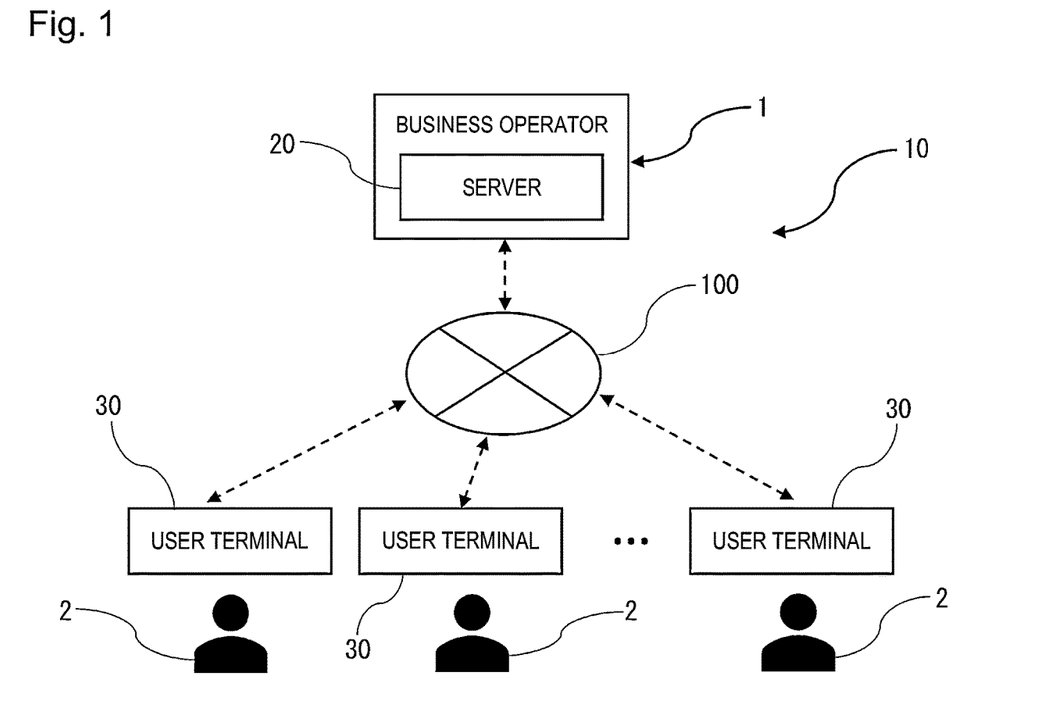
FIG. 1 is a block diagram illustrating an outline of a configuration of an information processing system according to an embodiment of the present invention.

FIG. 1 is a block diagram illustrating an outline of a configuration of an information processing system according to an embodiment of the present invention. As shown in the figure, for example, an information processing system 10 includes a server 20 and one or more user terminals 30 (information processing terminals), and these are connected so as to be accessible to each other via a network 100 such as the Internet network. Note that, by providing the function of the server 20 in the user terminal 30, the information processing system 10 may be constituted by only the user terminals 30. Further, although the information processing system 10 of the present example is a system that provides an application in the field of games, the information processing system of the present invention is not limited thereto, and can also be applied to systems that provide applications in various fields other than the field of games. Examples of fields other than games that can be mentioned include an application for viewing the interior of real estate. It is possible to move a character three-dimensionally within a building within the relevant application, control the three-dimensional motion of a virtual camera, and three-dimensionally control a field of view (visual field) of a display image that is displayed on a screen.

In the present embodiment, the server 20 is installed in a business operator 1 (system administrator) that provides an application (in the present example, a game) in the information processing system 10, and the user terminal 30 is owned by a user 2 who utilizes the application provided by the business operator 1.

The game provided by the business operator 1 in the information processing system 10 may be, for example, a fighting game, a shooting game, a puzzle game, an action game, a baseball game, a soccer game, another sports game, a quiz game, a pinball game, a card game, a rhythm game, an RPG (role-playing game), a location-based game, a board game, an adventure game, a casino game, a simulation game, a strategy game, a racing game, or a game that is a combination of any plurality of these games or the like.

Next, the specific configuration of each part of the information processing system 10 of the present embodiment will be described. In the following description, the term "game" can be replaced with the term "application".

In the present embodiment, the server 20 is implemented by a desktop or notebook computer (information processing device).

Figure 2:
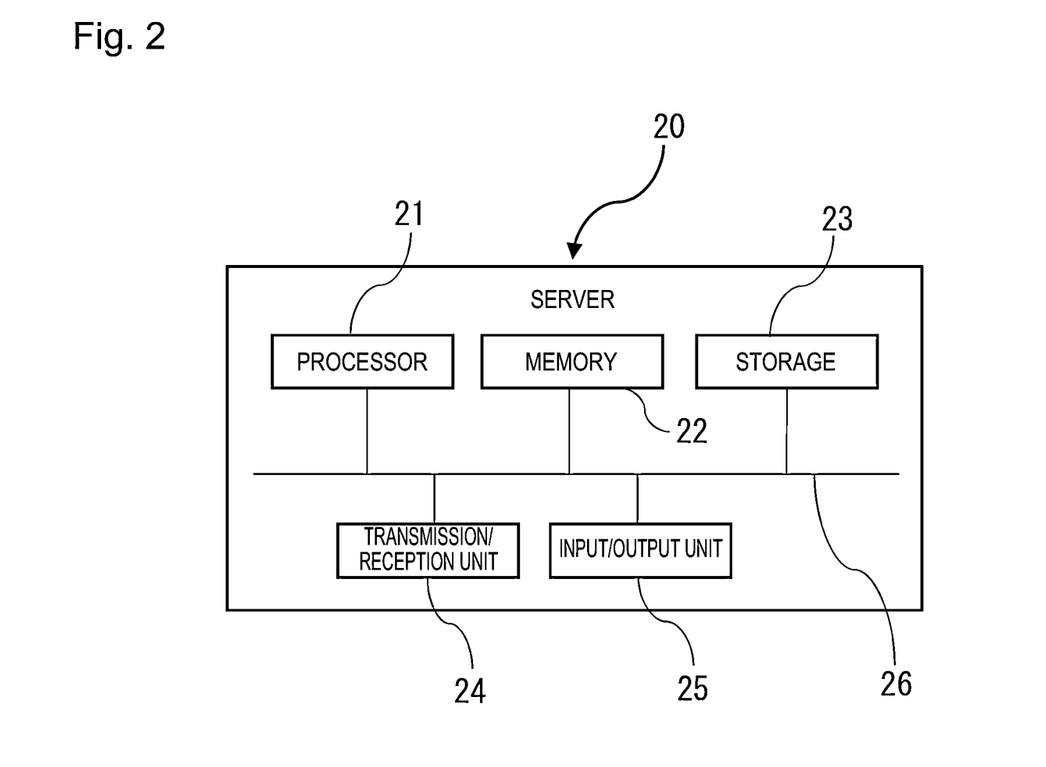
FIG. 2 is a block diagram illustrating an outline of a configuration of a server of the information processing system according to the present embodiment.

FIG. 2 is a block diagram illustrating an outline of the configuration of the server 20. As shown in the figure, the server 20 includes a processor 21, a memory 22, a storage 23, a transmission/reception unit 24, and an input/output unit 25, and these are electrically connected to each other via a bus 26.

The processor 21 is an arithmetic device that controls the operation of the server 20, controls the transmission/reception of data between respective elements, and performs the processing necessary for executing an application program and the like.

In the present embodiment, the processor 21 is, for example, a CPU (Central Processing Unit), and performs each processing by executing an application program stored in the storage 23, described later, and expanded in the memory 22.

The memory 22 includes a main storage device composed of a volatile storage device such as a DRAM (Dynamic Random Access Memory), and an auxiliary storage device composed of a non-volatile storage device such as a flash memory or an HDD (Hard Disk Drive).

While on one hand the memory 22 is used as a working area of the processor 21, on the other hand the memory 22 is also used to store the BIOS (Basic Input/Output System) executed at startup of the server 20, various kinds of setting information, and the like.

The storage 23 stores information and the like used for programs and various processing. The configuration of the storage 23 will be described later. Note that, although in the present example a storage unit of the server 20 is constituted by the memory 22 and the storage 23, the present invention is not limited thereto.

The transmission/reception unit 24 connects the server 20 to the network 100. The transmission/reception unit 24 may be provided with a short-range communication interface such as Bluetooth (registered trademark) or BLE (Bluetooth Low Energy).

The input/output unit 25 is an interface to which an input/output device such as a keyboard, a mouse, or a display is connected.

The bus 26 transmits, for example, address signals, data signals, and various control signals between the connected processor 21, memory 22, storage 23, transmission/reception unit 24, and input/output unit 25.

Figure 3:
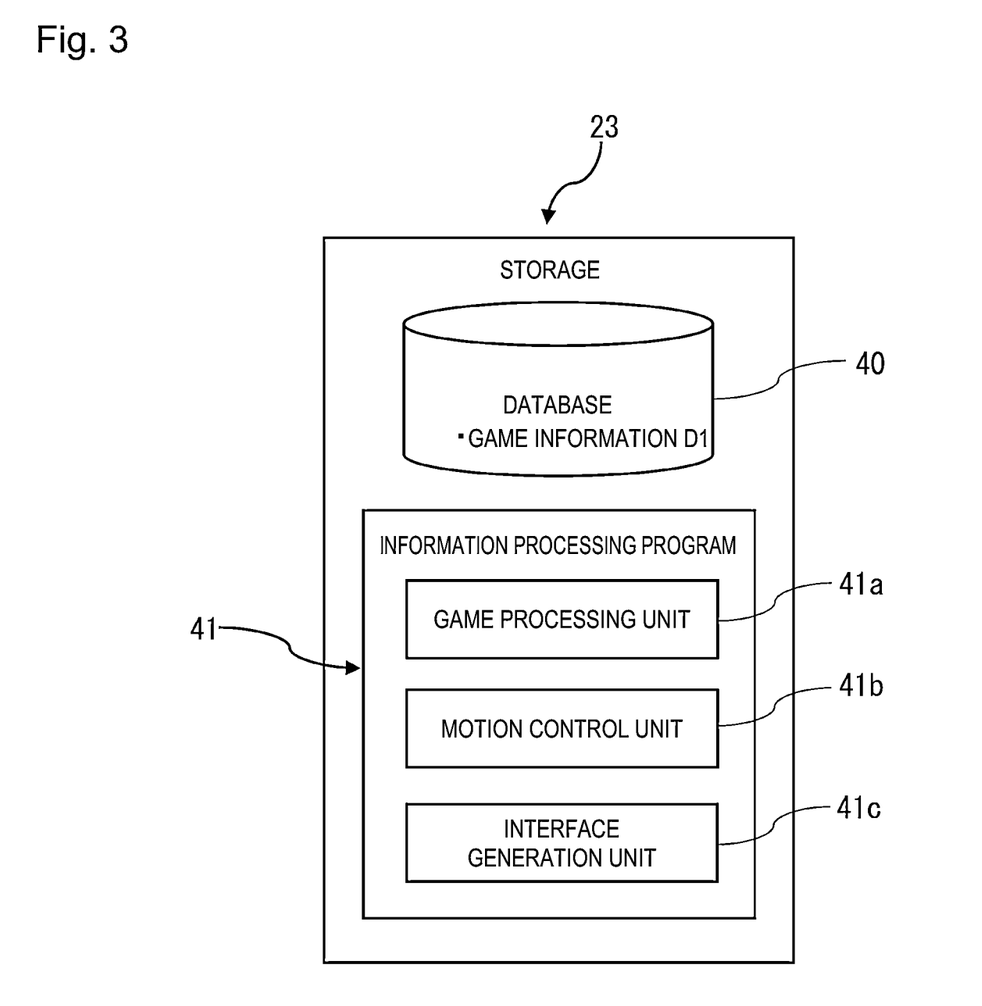
FIG. 3 is a block diagram illustrating an outline of a configuration of a storage of the server of the information processing system according to the present embodiment.

FIG. 3 is a block diagram illustrating an outline of the configuration of the storage 23. As shown in the figure, in the present embodiment, the storage 23 includes a database 40 and an information processing program 41.

The database 40 is implemented as a storage area provided by the storage 23, and in the present embodiment, game information D1 as one example of application information is stored in the database 40.

Figure 4:
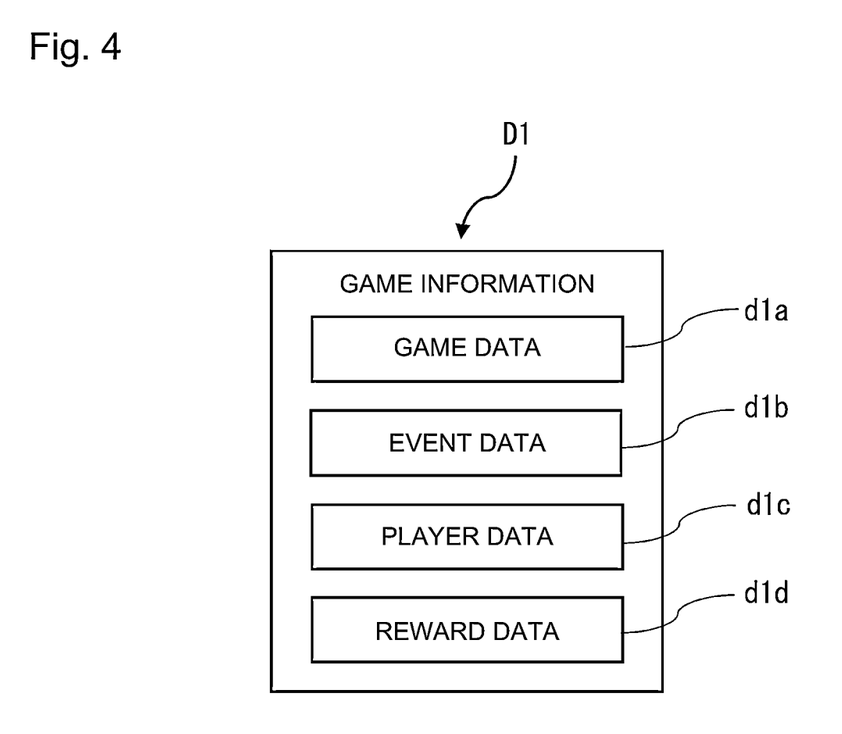
FIG. 4 is a block diagram illustrating an outline of a configuration of game information processed by the information processing system according to the present embodiment.

FIG. 4 is a block diagram illustrating an outline of the configuration of the game information D1. As shown in the figure, the game information D1 includes game data d1a, event data d1b, player data d1c, and reward data d1d.

In the present embodiment, the game data d1a is composed of data related to the settings of a game according to the type of game, such as characters and items appearing in the game, background images and the like, and for example, in the case of a fighting game, a stage name and the like associated with a stage ID are included.

In the present embodiment, characters constituting the game data d1a include a player who acts in a game by operations performed by the user 2 via the user terminal 30, a character that becomes a companion of the player, or an enemy character who plays against the player or the like.

In the present embodiment, the event data d1b is composed of an arbitrary event in which a trial (for example, fighting with an enemy character) is set for the user 2 to execute as a player, and when this type of event is cleared by the player, in-game rewards, which are described later, such as items used in the game or recovery of the player's energy may be granted.

In the present embodiment, the player data d1c is composed of a player name, data related to a character owned by the user 2 as a player, data related to settings with respect to motions of the player of the user 2, data related to items owned by the player of the user 2, and data related to the play stages and the like.

The data related to the owned character includes, for example, the current values of various parameters, such as the level, attack power, defense power, and physical strength which are associated with the ID of the character.

The data related to settings with respect to motions of the player includes, for example, any preset criteria associating a three-dimensional motion vector of a finger of the user 2 with a motion vector of the player.

In the present embodiment, criteria is included such as, for example, that when a finger of the user 2 moves in the x-direction, the player also moves in the x-direction, and when a finger of the user 2 moves in the y-direction, the player also moves in the y-direction. The data related to settings with respect to motions of the player may include, for example, information showing the relation between the direction of a motion vector of a finger and the direction of a motion vector of a movable object (player). In addition to a case where the direction of a motion vector of a finger and the direction of a motion vector of a movable object are made to match, a case where an angle is corrected by predetermined arithmetic processing (for example, a case where the player moves in the y-direction when a finger of the user 2 moves in the x-direction, and the player moves in the z-direction when a finger of the user 2 moves in the y-direction or the like) can also be included. The data related to settings with respect to motions of the player may also include, for example, information that shows the relation between the size of a motion vector of a finger and the size of a motion vector of a movable object (player). For example, the aforementioned data includes information regarding a correspondence relation such that when a finger of the user 2 moves 10 mm from a reference position, the movable object also moves 10 mm within the application, or moves a distance obtained by multiplying 10 mm by a predetermined multiplication factor. Further, a three-dimensional motion of a finger of the user 2 may be associated with a zoom-in motion and a zoom-out motion of the screen within the application.

The data related to the owned items includes, for example, a value such as the number of possessed items associated with an item ID.

The data related to the play stages is data related to the stage(s) that the user 2 has played up to the current time as a player among a plurality of set stages, and for example, includes the number of plays or the data when a stage was cleared.

The reward data did is data related to the in-game reward (s) granted to the player.

In the present embodiment, for example, the in-game rewards include: execution of an arbitrary event that is executed in the game; an increase in a drop rate, which indicates the probability of the player acquiring any item; in-game points to be spent when exchanging for items in the game and restoring the player's energy; or in a case where a function which can be executed in the game is restricted, a function execution command that lifts the restriction and executes the function, and the like.

In the present embodiment, the information processing program 41 shown in FIG. 3 includes a game processing unit 41*a*, a motion control unit 41*b*, and an interface generation unit 41*c*.

In the present embodiment, the game processing unit 41*a* is a module that executes basic processing of a game, such as progression of the game or control of a character, and in the present embodiment the game processing unit 41*a* executes, for example, character growing processing, event processing, function restriction processing, reward granting processing, and the like.

In the present embodiment, the character growing processing is processing in which the values for the experience and energy of the character that the user 2 selected as a player are improved, for example, based on arbitrary actions which are set in advance that the user 2 makes the character perform, such as making the character run or swim, thereby executing growth of the character.

In the present embodiment, the event processing is processing that executes an event according to the action of the character the user 2 selected as a player, the function restriction processing is processing that executes restriction of a function executed in the game as well as lifting of the restriction, and the reward granting processing is processing that grants in-game rewards to the player that the user 2 uses.

The game processing unit 41*a* also executes various kinds of basic processing of the game.

In the present embodiment, the motion control unit 41*b* shown in FIG. 3 is a module that controls the motion of a player in the game.

Figure 5:
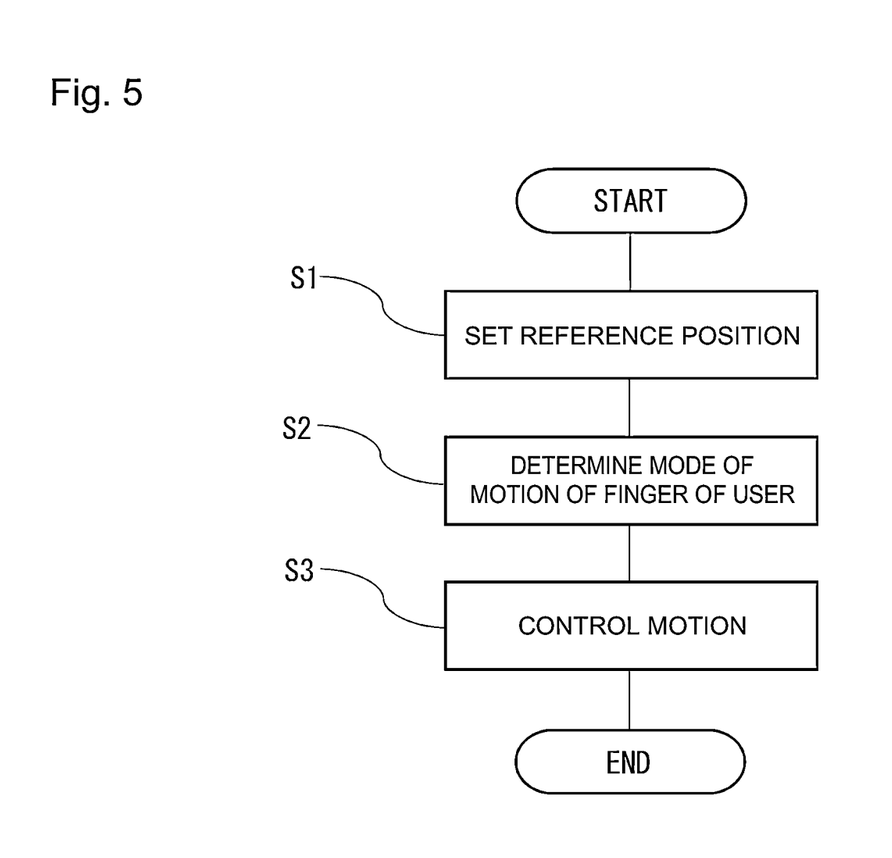
FIG. 5 is a flowchart illustrating an outline of processing by a motion control unit of an information processing program of the information processing system according to the present embodiment.

FIG. 5 is a flowchart illustrating an outline of processing executed by the motion control unit 41*b*. First, after the game is started up, when beginning the game, when the position of a finger of the user 2 is detected by a three-dimensional camera (depth camera) as a detection unit, described later, of the user terminal 30, as shown in the figure, in step S1, the motion control unit 41*b* sets the detected position of the finger of the user 2 as a reference position which is used when controlling the motion of the player.

In the present embodiment, for example, when the user 2 holds their finger over an arbitrary location on the front-face side of the user terminal 30, the three-dimensional camera detects the position of the finger of the user 2 at that location, and sets the detected position as the reference position. The timing for setting the reference position may be a preset timing such as the time of performing initial settings when using the application for the first time, or may be a timing that is based on an operation of the user 2 such as when the user 2 selected a reference position setting icon displayed on the screen.

Following setting of the reference position, when the game is started, in step S2, the mode of motion of the finger of the user 2 is determined based on a detection signal that is generated according to a three-dimensional motion of the finger of the user 2 detected by the three-dimensional camera of the user terminal 30 and is transmitted from the user terminal 30. The phrase "a three-dimensional motion of the finger of the user 2 detected by the three-dimensional camera" means a three-dimensional position of the finger relative to the reference position, or a moving direction, moving distance, moving speed, acceleration of the like of the finger.

In the present embodiment the mode of motion of the finger of the user 2 is determined, for example, by determining whether the motion is one in which the user 2 moves their finger three-dimensionally in the upward, downward, left or right direction of the user terminal 30, or whether the motion is one in which the user 2 moves their finger three-dimensionally in the depth direction of the user terminal 30 or the like.

Upon the mode of motion of the user 2 being determined, in step S3, the virtual three-dimensional motion of the player within the game is controlled.

Figure 6:
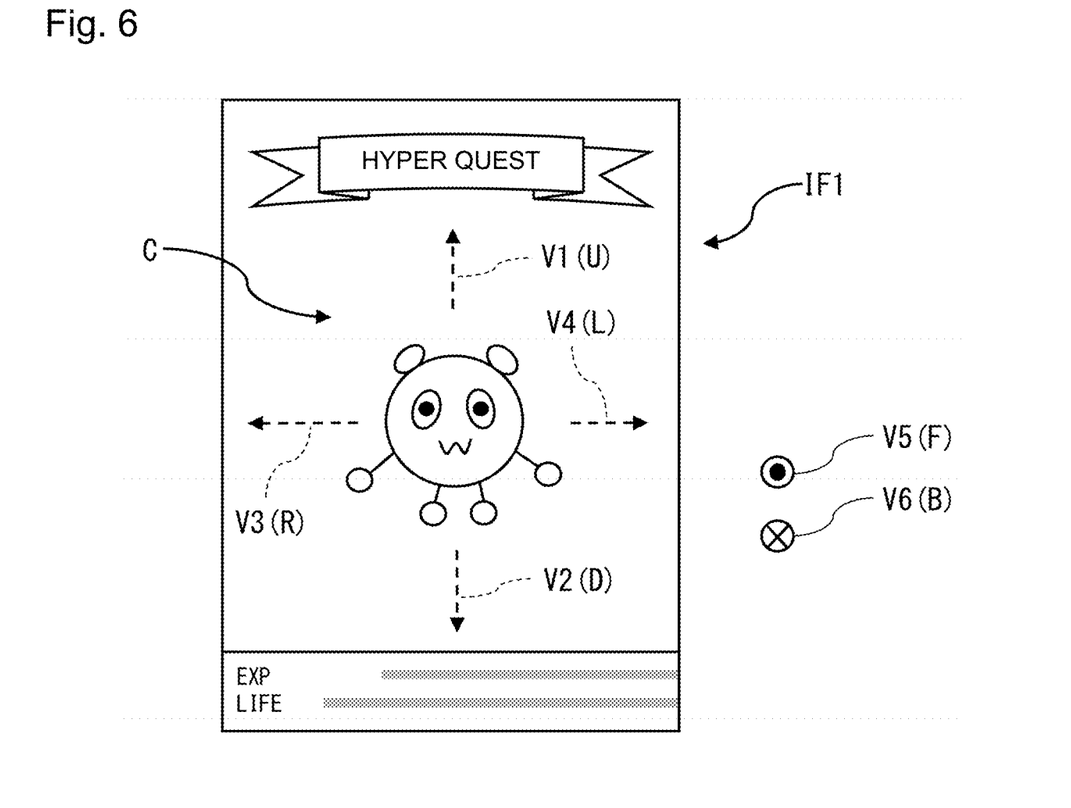
FIG. 6 is a view showing an example of a game screen of the information processing system according to the present embodiment.
Figure 7:
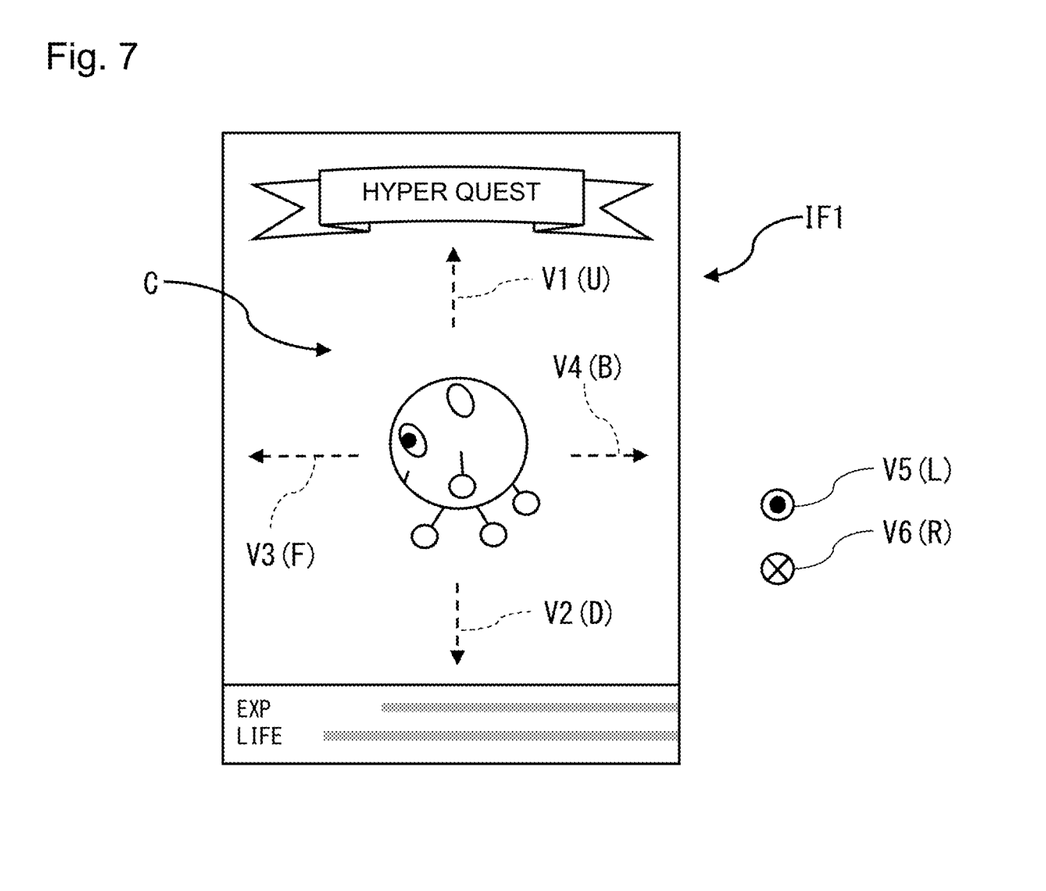
FIG. 7 is a view showing an example of a game screen of the information processing system according to the present embodiment.
Figure 8:
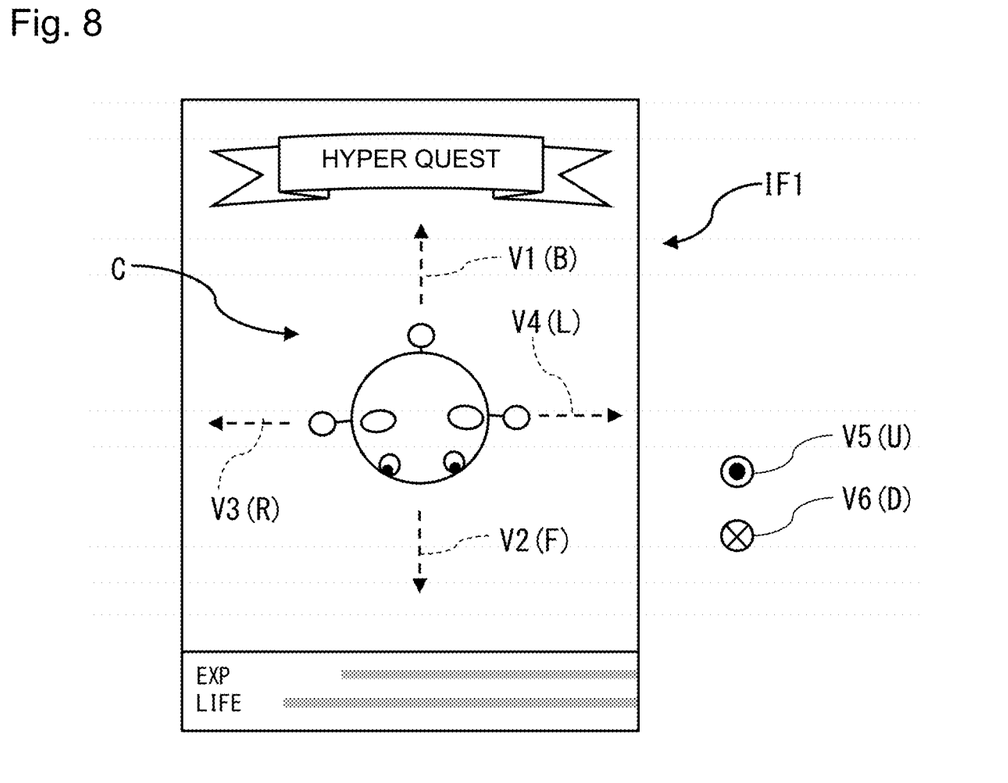
FIG. 8 is a view showing an example of a game screen of the information processing system according to the present embodiment.

Further, an image displayed on the user terminal 30 may from a third-person viewpoint of the player as shown in FIGS. 6, 7, and 8, or may be from a first-person viewpoint. A first-person viewpoint is suitable for the field of 3D action shooting such as FPS (First Person Shooter). Further, in the present system, the server 20 or the user terminal 30 may be equipped with a viewpoint switching unit that switches between a third-person viewpoint and a first-person viewpoint. Such switching of the viewpoint may be switching that is automatically performed on the server 20 or user terminal 30 side according to the progress of the game or the scene, or a configuration may be adopted so that the viewpoint can be switched in response to a request made by the user via the user terminal 30. In the case of the first-person viewpoint, the field of view of the display image displayed on the user terminal 30 changes according to the motion of a movable object (character, virtual camera or the like) within the application. Specifically, a scene that is visible virtually from the viewpoint of the character is displayed according to the direction in which the character is facing (line-of-sight direction). In the case of the third-person viewpoint, as illustrated in FIGS. 6, 7, and 8, an image of the character taken from a position that is separated by a predetermined distance from the character is displayed on the screen. Note that, a configuration may be adopted that allows the field of view of the image displayed on the user terminal to be directly controlled based on a three-dimensional motion of a finger. In other words, control of the image pickup range (field of view) of a virtual camera within the application (including zooming in and zooming out) can be performed based on a three-dimensional motion of a finger. In this case, the motion of a virtual camera that, within the application, virtually captures a background image or a movable object within the application is controlled based on a three-dimensional motion of a finger, and the image pickup range of the virtual camera becomes the image that is displayed on the user terminal.

In the present embodiment, based on data related to settings with respect to motions of the player included in the player data d1c, a three-dimensional motion vector of a finger of the user 2 and a motion vector of a character C that the user 2 selected as a player are associated (or matched) to control the motions.

FIG. 6 is a view illustrating an outline of processing of the motion control unit 41b in a case where the view on the game screen is set so that the character C which the user 2 selected as a player is seen from the front.

As shown in the figure, in a case where it is determined that the mode of motion of a finger of the user 2 is a motion in which the finger is moved in the upward direction on the screen that is indicated by an arrow V1 or a motion in which the finger is moved in the downward direction on the screen that is indicated by an arrow V2, the motion of the character C displayed on a game screen IF1 is controlled so that the character C moves in the upward direction indicated by an arrow U or the downward direction indicated by an arrow D according to the mode of motion of the finger of the user 2.

Note that, in the present embodiment, a motion in the upward direction U is, for example, a jumping motion in a case where the character C is walking, and is an ascending motion in a case where the character C is flying, and a motion in the downward direction D is, for example, a crouching motion in a case where the character C is walking, and is a descending motion in a case where the character C is flying.

On the other hand, in a case where it is determined that the mode of motion of a finger of the user 2 is a motion in which the finger is moved in the left direction on the screen that is indicated by an arrow V3 or a motion in which the finger is moved in the right direction on the screen that is indicated by an arrow V4, the motion of the character C displayed on the game screen IF1 is controlled so that the character C moves in the right direction indicated by an arrow R or the left direction indicated by an arrow L according to the mode of motion of the finger of the user 2.

In addition, in a case where it is determined that the mode of motion of the finger of the user 2 is a motion in which the finger is moved forward in the depth direction with respect to the game screen IF1 that is indicated by an arrow V5 (for example, a motion that brings the finger nearer to the camera) or a motion in which the finger is moved backward in the depth direction with respect to the game screen IF1 that is indicated by an arrow V6 (for example, a motion that moves the finger away from the camera), the motion of the character C displayed on the game screen IF1 is controlled so that the character C moves in a forward direction indicated by an arrow F or a backward direction indicated by an arrow B according to the mode of motion of the finger of the user 2.

FIG. 7 is a view illustrating an outline of processing executed by the motion control unit 41b in a case where the view on the game screen IF1 is set so that the character C is seen from the side.

As shown in the figure, in a case where it is determined that the mode of motion of a finger of the user 2 is a motion in which the finger is moved in the upward direction V1 on the screen or a motion in which the finger is moved in the downward direction V2 on the screen, the motion of the character C displayed on the game screen IF1 is controlled so that the character C moves in the upward direction U or the downward direction D according to the mode of motion of the finger of the user 2.

Note that, in the present embodiment, a motion in the upward direction U is, for example, a jumping motion in a case where the character C is walking, and is an ascending motion in a case where the character C is flying, and a motion in the downward direction D is, for example, a crouching motion in a case where the character C is walking, and is a descending motion in a case where the character C is flying.

On the other hand, in a case where it is determined that the mode of motion of a finger of the user 2 is a motion in which the finger is moved in the left direction V3 on the screen or a motion in which the finger is moved in the right direction V4 on the screen, the motion of the character C displayed on the game screen IF1 is controlled so that the character C moves in the forward direction F or the backward direction B according to the mode of motion of the finger of the user 2.

In addition, in a case where it is determined that the mode of motion of a finger of the user 2 is a motion in which the finger is moved forward V5 in the depth direction with respect to the game screen IF1 or a motion in which the finger is moved backward V6 in the depth direction with respect to the game screen IF1, the motion of the character C displayed on the game screen IF1 is controlled so that the character C moves in the left direction L or moves in the right direction R according to the mode of motion of the finger of the user 2.

FIG. 8 is a view illustrating an outline of processing executed by the motion control unit 41b in a case where the view on the game screen IF1 is set so that the character C is seen from above.

As shown in the figure, in a case where it is determined that the mode of motion of a finger of the user 2 is a motion in which the finger is moved in the upward direction V1 on the screen or a motion in which the finger is moved in the downward direction V2 on the screen, the motion of the character C displayed on the game screen IF1 is controlled so that the character C moves in the backward direction B or the forward direction F according to the mode of motion of the finger of the user 2.

On the other hand, in a case where it is determined that the mode of motion of the finger of the user 2 is a motion in which the finger is moved in the left direction V3 on the screen or a motion in which the finger is moved in the right direction V4 on the screen, the motion of the character C displayed on the game screen IF1 is controlled so that the character C moves in the right direction R or the left direction L according to the mode of motion of the finger of the user 2.

In addition, in a case where it is determined that the mode of motion of the finger of the user 2 is a motion in which the finger is moved forward V5 in the depth direction with respect to the game screen IF1 or a motion in which the finger is moved backward V6 in the depth direction with respect to the game screen IF1, the motion of the character C displayed on the game screen IF1 is controlled so that the character C moves in the upward direction U or moves in the downward direction D according to the mode of motion of the finger of the user 2.

Note that, in the present embodiment, a motion in the upward direction U is, for example, a jumping motion in a case where the character C is walking, and is an ascending motion in a case where the character C is flying, and a motion in the downward direction D is, for example, a crouching motion in a case where the character C is walking, and is a descending motion in a case where the character C is flying.

The interface generation unit 41c shown in FIG. 3 is a module that generates a state display interface that shows the state of a three-dimensional motion of a finger of the user 2.

Figure 9:
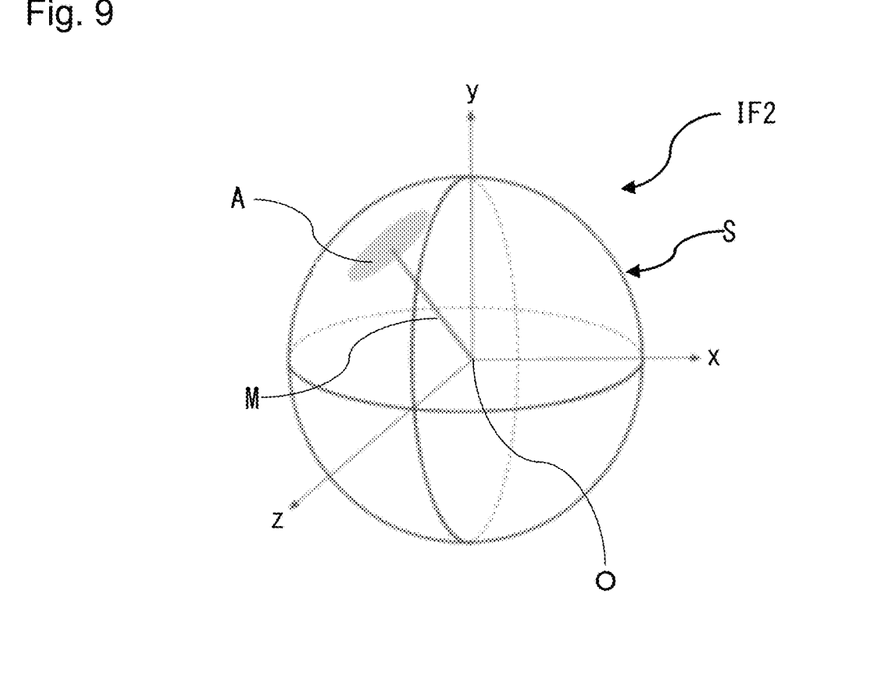
FIG. 9 is a view showing an example of a game screen of the information processing system according to the present embodiment.

FIG. 9 is a view illustrating an outline of the state display interface. As shown in the figure, a state display interface IF2 includes a transparent (or semi-transparent) virtual sphere S arranged in a virtual three-dimensional area consisting of an x-axis, a y-axis, and a z-axis.

In the present embodiment, a motion line M extends from a center point 0 of the virtual sphere S in accordance with the direction of a three-dimensional motion of the finger of the user 2, that is, the direction of the virtual three-dimensional motion of the character selected as a player, and a motion area A is displayed on the spherical surface of the virtual sphere S at the place where the motion line M and the virtual sphere S intersect.

The state display interface IF2 is displayed at an arbitrary location on the game screen, such as, for example, at the left lower part of the game screen. The position of the state display interface IF2 may be changeable. In such a case, for example, a configuration may be adopted in which a button image or the like for requesting a change in the position of the state display interface IF2 is displayed in advance on the game screen, and the user 2 selects the position change request button and then specifies an arbitrary position on the screen by performing a tap operation or the like, so that the position of the state display interface IF2 can thus be changed.

By this means, the user 2 can simultaneously visually recognize the three-dimensional motion of their own finger and also the virtual three-dimensional motion of the character which follows the three-dimensional motion of the user's finger, and hence the convenience when operating the game is improved.

In the present embodiment, the game is executed on the user terminal 30 based on processing in the information processing program 41 that includes the game processing unit 41a, the motion control unit 41b, and the interface generation unit 41c.

Although in the present embodiment the user terminal 30 shown in FIG. 1 is implemented on a smartphone, which is a portable information terminal, for example, the user terminal 30 may also be implemented on a dedicated game terminal, a tablet computer, a desktop computer, or a notebook computer.

Figure 10:
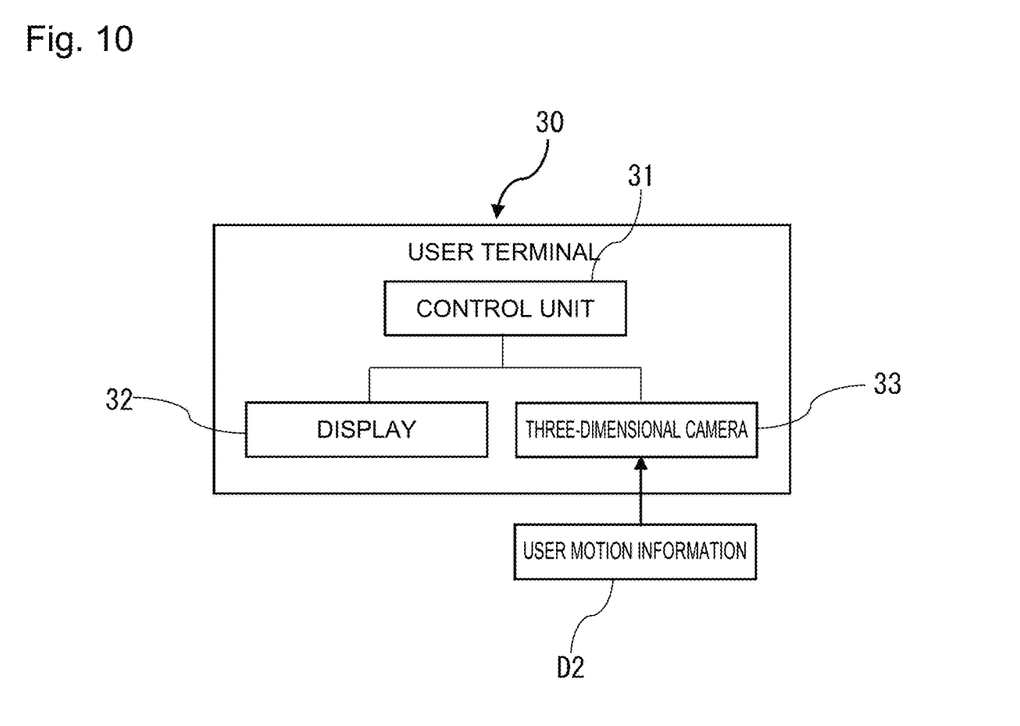
FIG. 10 is a block diagram illustrating an outline of a configuration of a user terminal of the information processing system according to the present embodiment.

FIG. 10 is a block diagram illustrating an outline of a configuration of the user terminal 30. As shown in the figure, the user terminal 30 includes, as main components, a control unit 31, a display 32, and a three-dimensional camera 33 as a detection unit. The detection unit is not limited to the three-dimensional camera 33, and may be various kinds of sensor devices or the like that are capable of detecting three-dimensional motion of a finger. Alternatively, an analysis unit that analyzes a video image taken by a monocular camera provided in the user terminal 30 to thereby estimate a three-dimensional motion may be provided in the server 20 or the user terminal 30 and caused to function as a detection unit.

In the present embodiment, the control unit 31 controls each unit of the user terminal 30 such as the display 32 and the three-dimensional camera 33, and is constituted by, for example, a processor, a memory, a storage, a transmission/reception unit, and the like.

In the present embodiment, a browser capable of browsing a game application or a website is stored in the control unit 31, and based on the processing in the information processing program 41 of the server 20, the game is executed on the user terminal 30 via a game application or a browser.

In the present embodiment, a screen interface of the game executed on the user terminal 30, including the game screen IF1 shown in FIG. 6 to FIG. 8, is displayed on the display 32.

The display 32 is a so-called touch panel that receives input of information by contact with the display surface, and is implemented by various techniques such as a resistive film method and an electrostatic capacitance method. Note that, although in the present example the display 32 and the three-dimensional camera 33 constitute an input unit that accepts an input operation from a user at the user terminal, the present invention is not limited thereto. As an input unit, the user terminal may have a keyboard or a mouse, or may have a microphone or the like with which an input operation can be performed by voice, or may have an eye tracking device that acquires line-of-sight information. The display 32 also constitutes a display unit that outputs application images.

In the present embodiment, the three-dimensional camera 33 is a front camera that is mounted on the front face of the smartphone that is the user terminal 30, and is configured to include various sensors such as a proximity sensor that detects the distance to an object, and detects user motion information D2.

The user motion information D2 is information inputted in relation to an operation or motion of the player, and is video image information based on an arbitrary motion of the user 2.

In the present embodiment, the user motion information D2 is, for example, information relating to a motion in which the user 2 moves their finger three-dimensionally in the upward, downward, left or right direction with respect to the user terminal 30, or a motion in which the user 2 moves their finger three-dimensionally in the depth direction (forward-backward direction) with respect to the user terminal 30.

When the user motion information D2 is detected by the three-dimensional camera 33 of the user terminal 30, the three-dimensional camera 33 generates a detection signal according to the mode of motion of the user 2.

Next, an outline of the processing of the information processing system 10 according to the present embodiment will be described.

Figure 11:
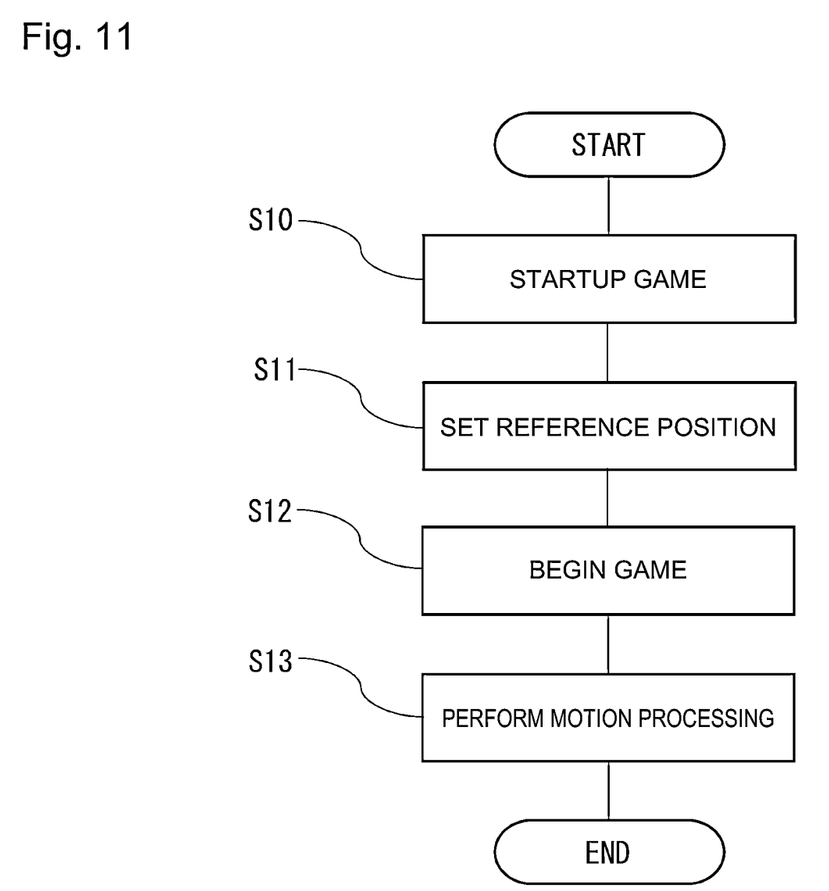
FIG. 11 is a flowchart illustrating an outline of processing of the information processing system according to the present embodiment.

FIG. 11 is a flowchart illustrating an outline of the processing of the information processing system 10 according to the present embodiment. As shown in the figure, first, in step S10, the user 2 starts up the game.

After the game has been started up, when beginning the game, when the user 2 holds their finger over the three-dimensional camera 33 of the user terminal 30 and the three-dimensional camera 33 detects the position of the finger of the user 2, in step S11 the position of the finger of the user 2 that the three-dimensional camera 33 detected is set as a reference position which is used when controlling the motion of the player. More specifically, preferably the position of the tip of any one finger is detected and set as the reference position. Note that, a position that is detected is not limited to a fingertip, and a configuration may be adopted so as to detect a specific joint or an arbitrary part of a finger.

After the reference position is set, in step S12, the user 2 begins the game.

When the game begins, in step S13, the virtual three-dimensional motion of a character that the user 2 selected as a player is controlled based on the three-dimensional motion of the finger of the user 2.

In the present embodiment, for example, the character performs virtual three-dimensional motion within the game in a vector that corresponds to (or matches) a three-dimensional motion vector of the finger of the user 2 that is in accordance with a motion in which the user 2 moves their finger three dimensionally in the upward, downward, left or right direction of the game screen or a motion in which the user 2 moves their finger three dimensionally in the depth direction of the game screen. The direction, distance, speed, and acceleration of the three-dimensional motion of the finger of the user 2 need not completely match the direction, distance, speed, and acceleration of the three-dimensional motion of the character within the game, and it suffices that there is at least a correspondence therebetween, for example, by performing correction processing based on a predetermined formula that is set in advance or the like.

As described above, in the present system, the three-dimensional motion of a movable object within an application is controlled based on a three-dimensional motion of a finger of the user that is detected by a detection unit. Thus, the convenience of the user 2 when operating the application is improved. Specifically, in present example, by the character which the user 2 selected as a player being controlled so as to follow a three-dimensional motion of the finger of the user 2 detected by the user terminal 30, the user 2 can intuitively operate the game, and hence the convenience of the user 2 when operating the game is improved.

Note that, the present invention is not limited to the embodiment described above, and various modifications can be made without departing from the spirit of the invention.

Although a case in which the view (display image) on the game screen is set so that, from a third-person viewpoint, the character C which the user 2 selected as a player is seen from the front, a case in which the view is set so that the character C is seen from the side, and a case in which the view is set so that the character C is seen from above are described in the foregoing embodiment, for example, various settings such as a setting for viewing the character C from below or from behind may also be adopted. Further, the view on the game screen may be a first-person viewpoint that shows the scene which can be seen from the eyes of the character C.

In the foregoing embodiment, a configuration may be adopted so that, after the reference position is set, when the finger of the user 2 is at the reference position, a state is displayed in which the motion line M does not extend from the center point 0 of the virtual sphere S (the motion area A is not displayed), and the motion line M is positioned at the center point 0 (for example, the display of the center point 0 is enlarged, or made brighter, or made darker or the like). Further, at such a time, the character may be placed in a stopped state. Furthermore, a configuration may be adopted so that in a case where the user 2 stops their finger at a position that is separated from the reference position, the character continues to move in the direction of the position of the finger with respect to the reference position, in accordance with the position of the finger of the user 2 with respect to the reference position. In such a case, a configuration may be adopted so that the state display interface IF2 continues to display the motion line M extending from the center point 0 of the virtual sphere S, and the motion area A of the spherical surface in accordance with the direction of the virtual three-dimensional motion of the character.

Although a case where a three-dimensional motion of a finger of the user 2 is detected using the three-dimensional camera 33 mounted in the user terminal 30 is described in the foregoing embodiment, a three-dimensional motion of a finger of the user 2 may be detected using a motion sensor mounted in the user terminal 30.

In addition, the number of fingers of the user 2 detected by the user terminal 30 may be one, two, or any other number, and any finger may be detected such as the index finger, the middle finger, or the thumb. In the case of detecting two or more fingers, a configuration may be adopted so that a motion of opening two or more fingers, a motion of closing two or more fingers, a motion of two or more fingers moving together in the same direction and the like are detected, and a movable object within the application performs an associated motion according to each motion. In such a case, three-dimensional motions of fingers of the user, and the movable object within the application are associated and stored in advance in the storage unit. Further, a configuration may be adopted so that three-dimensional motions of a finger of the user and motions of the movable object within the application are associated. That is, a configuration may be adopted in which, based on an instruction of the user input via the user terminal 30, an arbitrary three dimensional motion of a finger of the user and a specific motion of the movable object within the application are associated and stored in the storage unit by the control unit of the server 20. For example, the server 20 causes a plurality of motions of the movable object within the application which have been stored in advance in the storage unit to be displayed on the user terminal 30, and receives via the user terminal 30 an instruction that selects a specific motion from among the plurality of motions, and also receives, based on an input operation via the user terminal 30, a three-dimensional motion of a finger of the user that the user wants to associate with the relevant motion. By this means, a three-dimensional motion of any finger can be stored in association with a specific motion of the movable object, and used to three dimensionally operate the movable object. Further, a three-dimensional motion (for example, a gesture) of a finger of the user and a predetermined operation within the application (for example, menu display, activation of a shortcut, an adjustment operation to adjust the volume or the like, zoom adjustment (screen enlargement/reduction), switching various functions on/off or the like) may be associated and stored in the storage unit. A configuration may be adopted so that the combination of the motion of the finger of the user and the operation within the application can be set by the user, or may be set in advance on the system administrator side. Further, a configuration may be adopted so that a motion of a finger or hand of the user detected by the user terminal is tracked and used as a controller of a game. In this case also, a utilization is also possible in which a motion of a finger or hand of the user and a predetermined motion within a game are associated and stored such as, for example, in a hand-to-hand fighting game, a motion that throws a punch or the like which is associated with a motion of a finger or hand is executed in a manner that follows the associated motion that is detected, or in a racing game, a steering wheel within the game is moved in a manner that follows the motion of the finger or hand. Note that, the game is not particularly limited, and may be, for example, a so-called video game or VR game.

Further, in the present system, the detection unit may be configured to detect a finger of the right hand or a finger of the left hand. In this case, because motions that differ between a finger of the right hand and a finger of the left hand can be set, variations with respect to operation of the movable object increase. In addition, it is possible to operate the movable object using one or more fingers on either the left or right hand, or fingers on both hands.

The present invention has the following configurations.

(Item 1)

An information processing system which provides an application that can be executed on an information processing terminal, including:
  a detection unit that detects a three-dimensional motion of a finger of a user, and
  a motion control unit that controls a three-dimensional motion of a movable object within the application based on the three-dimensional motion of the finger of the user detected by the detection unit.

(Item 2)

The information processing system as set forth in Item 1, wherein:
  the detection unit includes a three-dimensional camera.

(Item 3)

The information processing system as set forth in Item 1 or 2, wherein:
  the motion control unit sets a position of the finger of the user detected by the detection unit at a predetermined timing as a reference position used when controlling the motion of the movable object.

(Item 4)

The information processing system as set forth in Item 3, including:
  an interface generation unit that generates a state display interface that shows a relative three-dimensional position of the finger of the user with respect to the reference position.

(Item 5)

The information processing system as set forth in any one of Items 1 to 4, wherein:
  the motion control unit associates a three-dimensional motion vector of the finger of the user with a motion vector of the movable object within the application.

(Item 6)

The information processing system as set forth in any one of Items 1 to 5, wherein:
  the motion control unit associates a direction of a motion of the finger of the user with a direction of a motion of the movable object within the application according to a setting of a direction of the movable object displayed on an application screen.

(Item 7)

The information processing system as set forth in any one of Items 1 to 6, wherein:
  the motion control unit controls a field of view of a display image within the application based on a three-dimensional motion of the movable object.

(Item 8)

A program that causes a computer to execute:
  in an information processing system which provides an application that can be executed on an information processing terminal,
  detection processing for detecting a three-dimensional motion of a finger of a user with a detection unit, and
  motion control processing for controlling a three-dimensional motion of a movable object within the application based on the three-dimensional motion of the finger of the user.

(Item 9)

An information processing method, including:
  in an information processing system which provides an application that can be executed on an information processing terminal,
  a detection step of detecting a three-dimensional motion of a finger of a user with a detection unit, and
  a motion control step of controlling a three-dimensional motion of a movable object within the application based on the three-dimensional motion of the finger of the user.

REFERENCE SIGNS LIST

1 Business operator
2 User
10 Information processing system
20 Server
30 User terminal
33 Detection sensor
40 Database
41 Information processing program (program)
41b Motion control unit
41c Interface generation unit
D2 User motion information
IF2 State display interface

The invention claimed is:

1. An information processing system which provides an application that can be executed on an information processing terminal, the system comprising:
  a detection unit that detects a three-dimensional motion of a finger of a user,
  a motion control unit that controls a three-dimensional motion of a movable object within the application based on the three-dimensional motion of the finger of the user detected by the detection unit, and sets a position of the finger of the user detected by the detection unit at a predetermined timing as a reference position used when controlling the motion of the movable object, and
  an interface generation unit that generates a state display interface that shows the reference position and a relative three-dimensional position of the finger of the user with respect to the reference position,
  wherein the state display interface has:
    a virtual sphere having a center point that corresponds to the reference position, and an interior that is transparently displayed, and
    a motion line extending from the center point to a point corresponding to a three-dimensional position of the finger of the user.

2. The information processing system according to claim 1, wherein:
  the detection unit comprises a three-dimensional camera.

3. The information processing system according to claim 1, wherein:
  the motion control unit associates a three-dimensional motion vector of the finger of the user with a motion vector of the movable object within the application.

4. The information processing system according to claim 1, wherein:
  the motion control unit associates a direction of a motion of the finger of the user with a direction of a motion of the movable object within the application according to a setting of a direction of the movable object displayed on an application screen.

5. The information processing system according to claim 1, wherein:
the motion control unit controls a field of view of a display image within the application based on the three-dimensional motion of the movable object.

6. A non-transitory computer readable medium having stored thereon computer-executable codes, which, when executed by a processor, perform an information processing method, the method comprising:
in an information processing system which provides an application that can be executed on an information processing terminal,
detection processing for detecting a three-dimensional motion of a finger of a user with a detection unit,
motion control processing for controlling a three-dimensional motion of a movable object within the application based on the three-dimensional motion of the finger of the user, and setting a position of the finger of the user detected by the detection unit at a predetermined timing as a reference position used when controlling the motion of the movable object, and
interface generation processing for generating a state display interface that shows the reference position and a relative three-dimensional position of the finger of the user with respect to the reference position,
wherein the state display interface has:
a virtual sphere having a center point that corresponds to the reference position, and an interior that is transparently displayed, and
a motion line extending from the center point to a point corresponding to a three-dimensional position of the finger of the user.

7. An information processing method, comprising:
in an information processing system which provides an application that can be executed on an information processing terminal,
a detection step of detecting a three-dimensional motion of a finger of a user with a detection unit,
a motion control step of controlling a three-dimensional motion of a movable object within the application based on the three-dimensional motion of the finger of the user, and setting a position of the finger of the user detected by the detection unit at a predetermined timing as a reference position used when controlling the motion of the movable object, and
an interface generation step of generating a state display interface that shows the reference position and a relative three-dimensional position of the finger of the user with respect to the reference position,
wherein the state display interface has:
a virtual sphere having a center point that corresponds to the reference position, and an interior that is transparently displayed, and
a motion line extending from the center point to a point corresponding to a three-dimensional position of the finger of the user.

* * * * *